United States Patent [19]

Edmondson

[11] 3,952,725

[45] Apr. 27, 1976

[54] SOLAR WATER HEATER

[76] Inventor: William B. Edmondson, 4701 Salerno St., San Diego, Calif. 92111

[22] Filed: June 24, 1974

[21] Appl. No.: 482,206

[52] U.S. Cl. ............................................. 126/271
[51] Int. Cl.² ......................................... F24J 3/02
[58] Field of Search ............ 126/270, 271; 237/1 A

[56] References Cited
UNITED STATES PATENTS

| | | | |
|---|---|---|---|
| 1,068,650 | 7/1913 | Harrison | 126/271 |
| 1,837,449 | 12/1931 | Kunz | 126/271 |
| 2,274,492 | 2/1942 | Modine | 126/271 |

FOREIGN PATENTS OR APPLICATIONS

| | | | |
|---|---|---|---|
| 938,012 | 9/1963 | United Kingdom | 126/271 |
| 801,627 | 4/1936 | France | 126/271 |

Primary Examiner—Kenneth W. Sprague
Assistant Examiner—James C. Yeung
Attorney, Agent, or Firm—Ralph S. Branscomb

[57] ABSTRACT

A solar water heater and method of constructing same, the heater being of the type in which the sun penetrates one or more panes of light-transmitting material and impinges on a blackened layer of soft-tempered conductive foil on which are disposed condudtive water-conveying tubes. Loosely packed glass wool between the pane and the foil inhibits convection currents and resilient, dense glass wool on the lower side of the foil, backed by a rigid panel, supports the foil. Conventional fasteners such as U-brads are used at spaced intervals on the tubing to fasten the tubing to the panel drawing the tubing against the foil and creating an elongated depression or trough in the foil beneath the tubing. Conductive cement or paint is applied in the trough prior to or after the fasteners are secured to maximize heat transfer from the foil to the tubing.

12 Claims, 10 Drawing Figures

SOLAR WATER HEATER

BACKGROUND OF THE INVENTION

The invention relates to solar water heaters and more particularly to the type in which sunlight impinges on an insulated blackened surface in thermal contact with water passages.

Many heaters of this type have been developed and the possibility of more widespread use of these and related devices is under increasing scrutiny. Aside from the flexible plastic bag type construction, which is not relevant to the instant invention, there are many prior art heaters whose operation is similar in principle and structure to that disclosed herein. These structures utilize a light-transmitting pane of plastic or glass to admit light to a blackened surface which is in contact with flowing water which is channelized by means of maze-type baffles, tubes, or corridors stamped in the blackened surface itself.

These heaters are not necessarily inefficient or inferior, but uniformly suffer one drawback from a practical standpoint which is the expense required to produce the units, especially on a small scale. Heavy presses or dies are required in their manufacture so that mass production is necessary for economical production. Another type utilizes metal tubing welded or soldered to the light absorbing sheet so that either considerable labor or expensive jigs would be required in manufacture.

SUMMARY OF THE INVENTION

The heater of the present invention is inexpensively and quickly manufactured without machinery or tooling aside from ordinary hand tools. The heater is preferably modular, any number of the individual units being connectable in parallel or series to accommodate specialized needs, and each unit is basically of sandwich construction having a rigid base panel which may be plywood, metal, or other suitable material. A layer of resilient, relatively dense fiber glass wool is disposed on the panel, and foil covers the upper surface of the fiberglass. A heat-conductive tube placed on top of the foil and having an inlet and outlet accessible externally of the unit is anchored to the rigid panel by U-brads or other ordinary fasteners which draw the tubing against the foil such that the soft-tempered foil, which is buttressed underneath by the resilient fiberglass, yields beneath the tubing to form a trough. In the trough is a quantity of heat-conductive sealant which could either be cement or paint with graphite dispersed therein, the sealant preferably being applied to the foil prior to the attachment of the fasteners. In this fasion the thermal contact between the foil and tubing is maximized without reverting to welding or other expensive processes.

Immediately above the foil and tubing there is provided loose-knit glass wool to minimize convection, heat losses, and spaced above the foil is a pane of any suitable light-transmitting substance. The unit is peripherally sealed by a border of wood, stiffened fiberglass wool, or the like.

DETAILED DESCRIPTION OF THE PREFERRED EMBODIMENT

The heater can be provided as discrete modular units which are easily interconnected or designed after manufacture, or constructed directly on the planking of an unfinished roof to obviate the need for separate modules.

Figure 1:
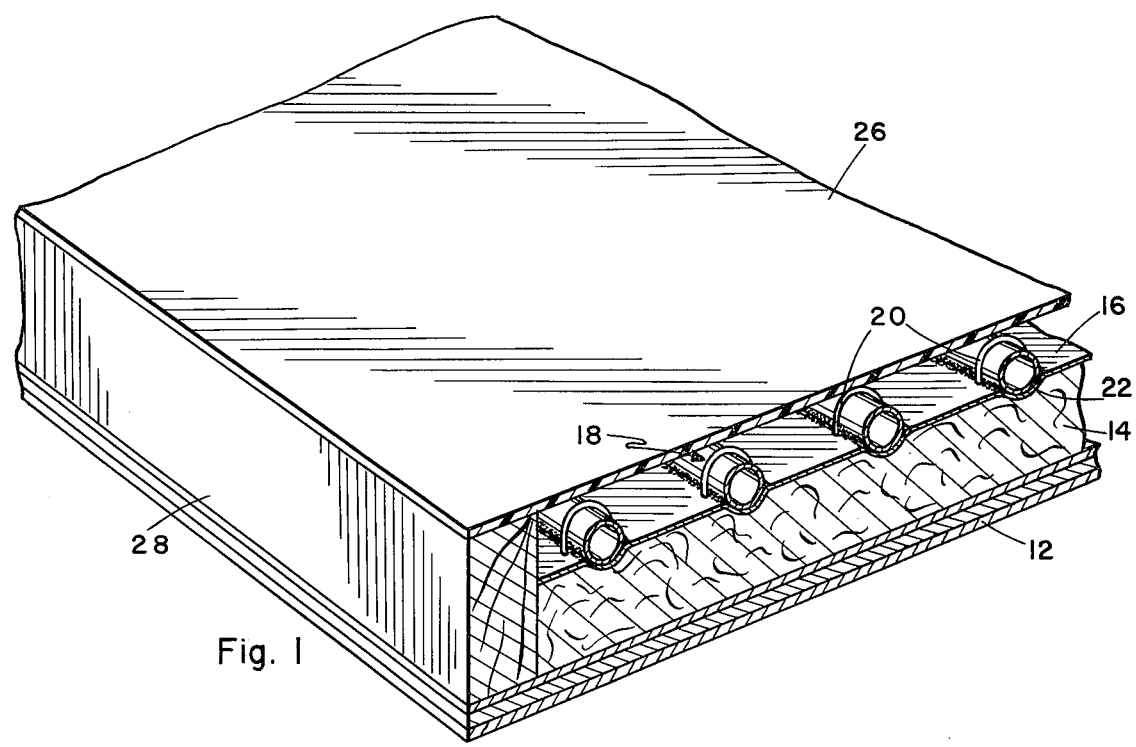
FIG. 1 is a perspective view, in section, of a portion of a typical panel.

FIG. 1 illustrates the general construction of the heater which is relatively simple. Rigidity is provided primarily by a backing panel (12) which may be plywood, metal or other suitably rigid material including the planking of an unfinished roof. Overlying the panel 12 is a layer of insulation material 14 which is at least slightly deformable and preferably resilient, fiberglass wool being very suitable, and Ownes-Corning 703 high-density fiberglass in particular having been found to perform very well in this capacity.

A sheet of soft tempered aluminum foil or other deformable heat-conductive material 16 is disposed flush with the upper surface of the insulation 14, and overlying this sheet in an arrangement of tubing, generally indicated at 18, which may be provided in several different configurations as described hereinafter. The tubing can be constructed of aluminum, copper or any other heat conductive material and in all configurations portions of the tubing are mutually parallel with the spacing between the parallel lengths being between three and six inches for optimum performance. It is contemplated that the foil thickness will be between two and five thousandths of an inch, and the tube spacing selected will be proportional to the foil thickness since increased foil conductivity permits greater separation of the tube portions.

Figure 6:
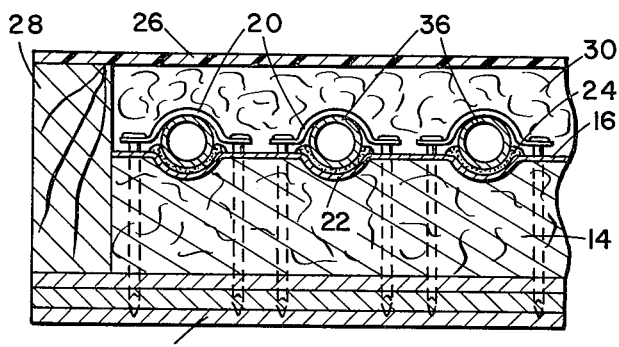
FIG. 6 is an enlarged sectional view taken on line 6—6 of FIG. 2.
Figure 7:
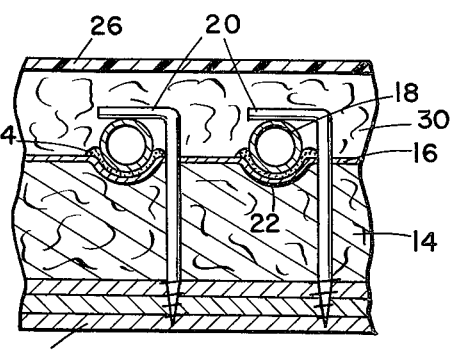
FIGS. 7, 8, and 9 are similar sectional views showing alternate methods of securing the pipes.

The attachment of the tubing, foil, insulation and panel is very simply and quickly done by hand. Referring to FIG. 1, 6, 7, a plurality of spaced fasteners 20 engage the tubing and are secured through the foil and insulation layer (14) into the backing panel. Any suitable fasteners can be used, but the U-brads of FIG. 1 are preferred, FIG. 6 and 7 showing a representative sample of obvious alternatives.

The installation of the fasteners draws the tubing down against the foil, and the resilient insulation layer 14 molds troughs 22 into the foil beneath the tubing which increases the thermal contact between the foil and tubing. To further increase conductivity, a conductive sealant is applied in the troughs which occupies the airspace around the tubing. Two types of sealant have been found effective, the first being conductive adhesive or cement, one example being a graphite-filled cement marketed under the trademark Thermon. The cement is thick-textured and must be applied either prior to mounting of the tubing, or the tubing and foil must be separated lightly by depressing the foil by hand beneath the tubing. The cement layers are illustrated at 24.

Figure 8:
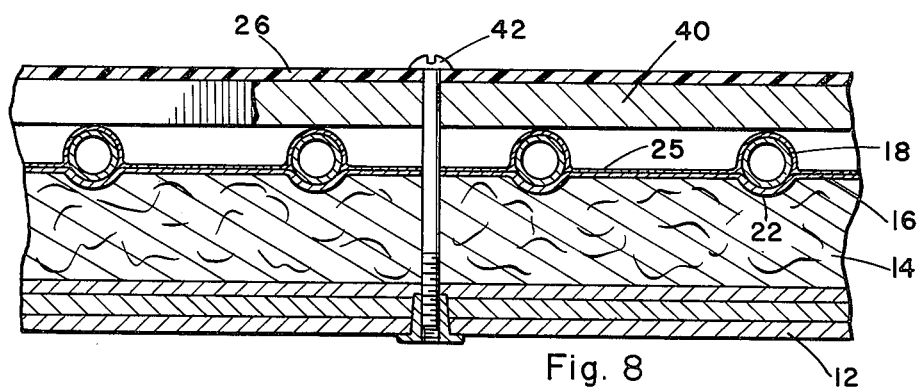
Figure 9:
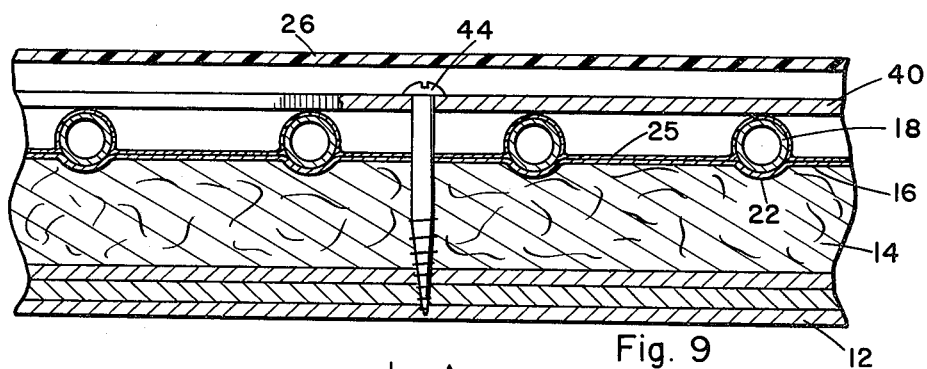
Figure 10:
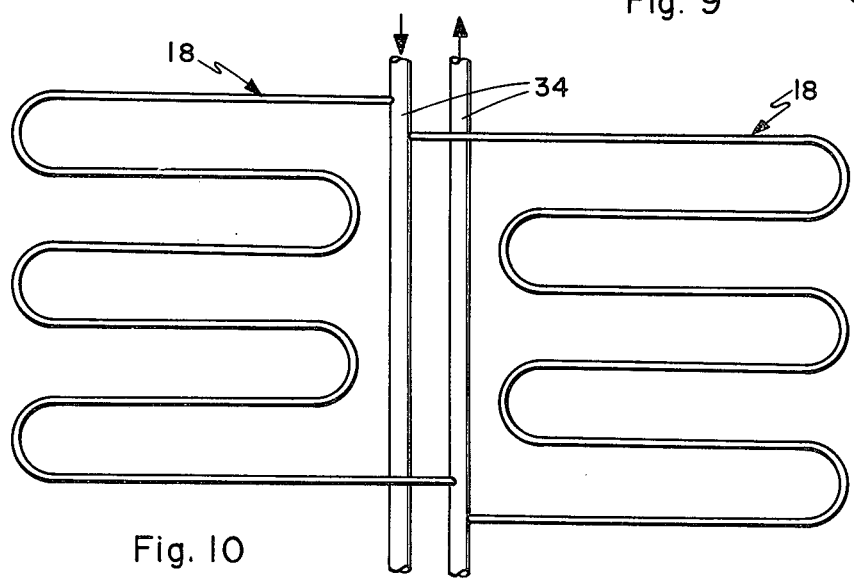
FIG. 10 is a schematic view of a multiple panel connection to common manifolds.

The other type of sealant is black paint with dispersed particulate graphite, which has a much thinner consistency than Thermon and can be applied over the entire surface of the foil and tubing after the tubing is installed as illustrated at 25 in FIGS. 8 and 9. The paint will seep into the troughs around the tubing to provide an effective thermal bond. It is preferred to use the graphite paint even if the cement sealant is also used inasmuch as it accomplishes the desired blackening of the upper surface of the foil and tubing, and additionally increases conductivity. Either or both of the sealants provide an increased thermal conductivity between the tubing and foil which is comparable in effectiveness to welding or soldering but is simpler and cheaper to use.

As an alternative to coating the foil with graphite paint, it is possible to chemically treat the exposed surface to create a "selective surface." Selective surfaces absorb the relatively short-wave radiation from the sun but are very poor radiators of long-wave infrared so that the efficiency of the heater would be significantly increased. This treatment is not preferred to the graphite paint only insofar as the advantages of simplicity and economy of the heater are diminished.

When the graphite paint is used, the foil should be highly reflective on both surfaces prior to the application of the paint to lessen radiation losses in both directions of the heat acquired by the foil by conduction.

Disposed above and parallel to the foil sheet is a pane of light-transmitting material 26. This pane is preferably a two or four mil panel of Tedlar, a Du Pont product known in the art for its ability to withstand the elements as well as selectively transmitting only the higher frequencies of light, being opaque to long-wave infrared. The Tedlar may be reinforced with wire mesh or supported on a transparent fiberglass panel, and in the latter case possibly being corrugated for additional strength and to allow for expansion when heated without buckling or warping.

In the modular version of the heater, each unit has a peripheral border 28 of wood, high density glass wool or the like which provides a mounting for the pane 26 and seals the unit from outside air currents. The border may simply be adhered to the pane and the panel with a silicone adhesive, and the necessary holes are provided for the inlet and outlet to the tubing.

In order to minimize convection currents in the heater, a very openfibered or loose-knit layer 30 of glass wool may be provided between the foil and the light-transmitting pane. A very suitable material for this purpose is a fiberglass air filter media produced by Owens-Corning, a 1 inch layer of which will transmit 85% of the incident light. Especially when the panels are used in a non horizontal position conducive to the circulation of connection currents the baffling effect of the wool more than compensates for the slight shadowing it produces on the foil. If additional support is required for the Tedlar pane, the loose fiberglass can be sprayed with a stiffening adhesive to which the Tedlar adheres for reinforcement.

From the above description, the operation of the heater should be clear. Sunlight enters through the pane 26 and impinges on the blackened upper surface of the foil 16 where it is delivered to the fluid circulating in the tubing, which will generally be water. The black-body radiation from the upper surface of the foil is in the infrared zone and is partially reflected by the Tedlar pane and the filter media and reabsorbed, and partially absorbed by the Tedlar causing a reduced temperature gradient in the heated area of the unit. The escape of heat from the foil to the Tedlar pane due to convection is inhibited by the glass wool 30, and the insulation 14 minimizes heat escape in the opposite direction, so that fairly high temperatures are developed in the circulating water.

Figure 2:
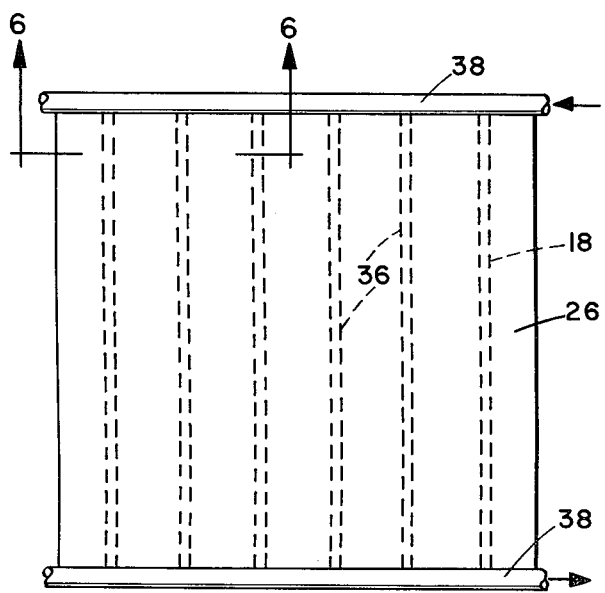
FIG. 2 is a top plan view of one form of the panel.
Figure 3:
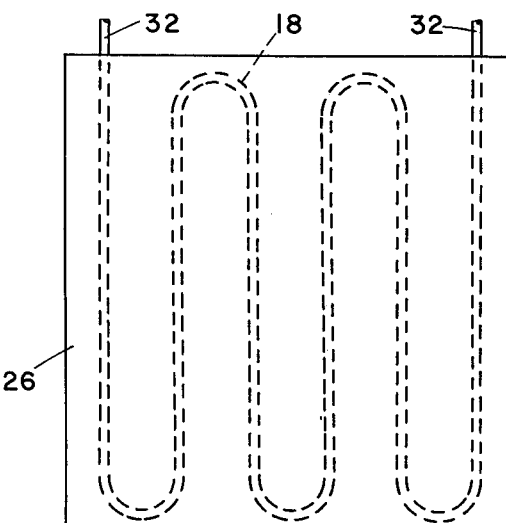
FIG. 3 is a top plan view of another form of the panel.
Figure 4:
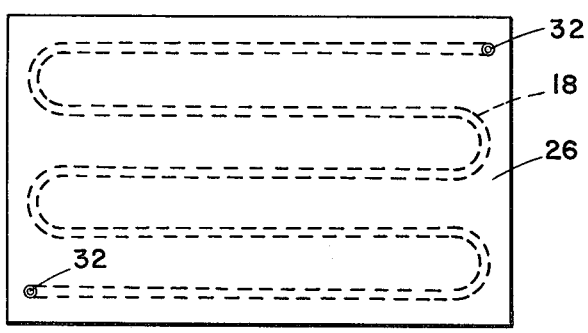
FIG. 4 is a top plan view of a further form of the panel.

Several minor variations in the structure are apparent from the drawings. The configurations of the tubing is preferably serpentine as shown in FIGS. 2, 3, 4, and 10 inasmuch as the number of tube joints are minimized. The tube ends 32 may exit through the border of the units as in FIG. 3, or through the planar backing panel as in FIG. 4, in either case being attachable to trunk lines 24 which by conventional coupling means connect with a water supply (not shown). Any number of the units may be attached to the trunk lines in this fashion. An alternative arrangement is shown in FIG. 2 in which parallel tube segments 36 are coupled at both ends to header pipes 38. This variation is appropriate in the instance of application of one large unit directly on an unfinished roof wherein use of a single serpentine would probably result in heating the water to equilibrium temperature considerably before the water exited the heater, as well as producing unnecessary friction losses.

Other construction variations are illustrated in FIGS. 8 and 9, in which one or more bars or beams 40 span the parallel portions of the tubing and are anchored to the backing panel 12 at intervals by bolts 42 or screws 44. The bolts are in the FIG. 8 modification engage the pane 26 as well as the bars to provide a strengthened unit for heavy duty applications.

It should also be noted that as an obvious variation of the unit more than one light-transmitting pane could be used to permit higher temperature build-up in the water. Considerations of reduced light penetration would have to be balanced along with the reduced loss of heat by conduction to arrive at the optimal design.

Figure 5:
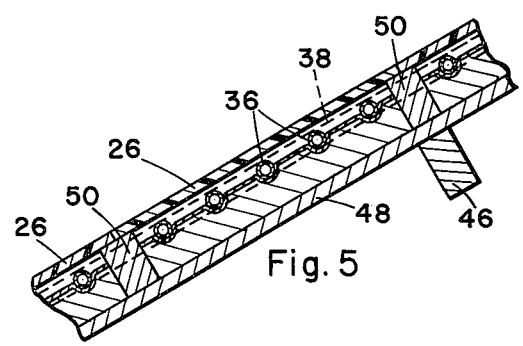
FIG. 5 is a sectional view of a portion of a roof structure in which the roof planking is used as the backing panel and the heater construction of FIG. 2.

FIG. 5 illustrates a roof installation using the general construction of the FIG. 2 embodiment wherein the roof planking 48 supported on the usual beam structure 46 doubles as the backing panel for the heater. The tubing and underlying layers can be secured directly to the planking and lateral wooden cross-beams 50 support the abutting edges of the panes 26, which may be sealed with a weather resistant tape or cement. An entire roof can be made in this fasion with the heater replacing the usual shingling or tile layer.

The heater described herein functions particularly well as a heater for swimming pools or a replacement for the conventional hot water heating system of a house. Additionally, space heating could be provided by the use of conventional radiators, and if the tubing system is adapted to withstand pressure slightly above atmospheric, water can be heated to a temperature higher than the boiling point and used in cooking. The latter application has been tried using a modified pressure cooker with a steam jacket, and it was found that temperatures of up to 250° F could be developed from a single heater module on clear days during the sunniest hours.

I claim:
1. A method of constructing a solar fluid heater comprising the following steps:
   a. placing a layer of deformable insulating material on the forward face of a panel;

b. placing a heat-conductive deformable sheet on said insulating layer;

c. placing conductive hollow tubing on said sheet;

d. pressing said tubing against said sheet and insulating layer to form a trough in said sheet beneath said tube; and e. attaching fastener means to and between said tubing and said panel to hold said tubing, sheet, and insulation in compressed relationship.

2. A method according to claim 1 wherein said fastener means comprises a plurality of U-shaped brads and steps (*d*) and (*e*) comprise driving said brads into said panel of spaced intervals on, and straddling, said tubing.

3. A method according to claim 1 and including the step of raising the tubing away from the sheet after step (*d*) and applying a layer of heatconductive adhesive in said through.

4. A method according to claim 1 and including the step of coating the exposed surfaces of said sheet and said tubing with a light-absorbent, heat-conductive substance comprising black paint having suspended therein particulate graphite.

5. A method according to claim 1 and including the following steps:

f. placing a layer of loose-knit glass wool on said sheet and tubing; and g. mounting a light-transmitting pane to said panel forward of said loose-knit glass wool to capture same between said pane and said sheet and tubing.

6. A solar fluid heater comprising:

a. a layer of deformable resilient insulating material;

b. a deformable heat-conductive sheet disposed on the forward surface of said layer;

c. heat-conductive hollow tubing disposed on said sheet;

d. means mounting said tubing, sheet, and insulating material together in compressed relationship whereby a depression is formed in said deformable sheet adjacent said tubing in partial conformity to the contours of said tubing to increase the area of the contacting surfaces of said sheet and tubing for increased heat transfer.

7. Structure according to claim 6 and including a heat-conductive sealant disposed in said trough between said sheet and said tubing.

8. Structure according to claim 7 wherein said sealant comprises paint having disposed therein particulate graphite and the entire forward surface of the sheet is coated with said sealant.

9. Structure according to claim 7 wherein said sealant comprises conductive cement.

10. Structure according to claim 6 and including:

a. a substantially rigid panel disposed on the rear surface of said insulating layer;

b. A light-transmitting pane mounted to said panel in spaced parallelism with said sheet on the side thereof remote from said panel; and c. convection inhibiting means disposed between said sheet and said pane.

11. Structure according to claim 10 wherein said convection inhibiting means comprises loose-knit glass wool.

12. Structure according to claim 6 and including a substantially rigid panel disposed on the rear surface of said insulating layer where in said tubing includes a plurality of substantially mutually parallel portions and said mounting means comprises:

a. at least one elongated bar member spanning said parallel portions essentially normal thereto; and b. at least one elongated fastener which passes through said insulating layer and connects said bar member to said panel.

* * * * *